United States Patent
Miljkovic et al.

(10) Patent No.: US 7,949,015 B2
(45) Date of Patent: May 24, 2011

(54) CLOCK SKEW COMPENSATION (75) Inventors: Dejan Miljkovic, Hägersten (SE); Tönu Trump, Enskede Gård (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 12/439,024

(22) PCT Filed: Aug. 28, 2006

(86) PCT No.: PCT/SE2006/050298
§ 371 (c)(1),
(2), (4) Date: Feb. 26, 2009

(87) PCT Pub. No.: WO2008/026976
PCT Pub. Date: Mar. 6, 2008

(65) Prior Publication Data
US 2010/0002683 A1 Jan. 7, 2010

(51) Int. Cl.
*H04J 3/06* (2006.01)
(52) U.S. Cl. .................. 370/503; 370/516
(58) Field of Classification Search .......... 370/503, 370/506, 516, 517, 518, 519
See application file for complete search history.

(56) References Cited

U.S. PATENT DOCUMENTS

| | | | | |
|---|---|---|---|---|
| 6,208,716 B1 * | 3/2001 | Brablec | | 379/88.09 |
| 7,378,995 B2 * | 5/2008 | Chen | | 341/61 |
| 2001/0020280 A1 * | 9/2001 | Bastin | | 714/1 |
| 2001/0055276 A1 * | 12/2001 | Rogers et al. | | 370/232 |
| 2002/0078225 A1 * | 6/2002 | Pines | | 709/234 |
| 2002/0167911 A1 | 11/2002 | Hickey | | |
| 2003/0169755 A1 | 9/2003 | Ternovsky | | |
| 2004/0062252 A1 | 4/2004 | Dowdal et al. | | |
| 2005/0180405 A1 | 8/2005 | Bastin | | |

OTHER PUBLICATIONS

Trump T "Compensation for clock skew in voice over packet networks by speech interpolation" Circuit and Systems May 2004, USA, vol. 5, p. 608-611, ISBN 0-7803-8251-X abstract.

Miljkovic D et al. "Clock skew Compensation by Speech Interpolation" International Conference on Digital Telecommunications, Aug. 29-31, 2006, USA, 6 pp, ISBN 0-7695-2650-0 abstract.

* cited by examiner

*Primary Examiner* — Huy D Vu
*Assistant Examiner* — Dady Chery (57) ABSTRACT

A method and arrangement in a receiving communication device for compensating for the difference between the clock-frequency controlled sample rate of the receiving device and the sample rate of a sending communication device. The sending device transmits packets comprising M audio samples to be stored in a buffer in the receiving device accommodating at least 2·M samples before play-out. An estimation of the clock skew is continuously updated from a calculated accumulated difference between an expected and an actual point of time of reception of the M audio samples. Before play-out, an adjusted number N of audio samples to be read from the buffer before play-out is calculated using the estimated clock skew. Thereafter, the N audio samples are resampled by interpolation to M audio samples to play-out.

24 Claims, 5 Drawing Sheets

CLOCK SKEW COMPENSATION

TECHNICAL FIELD

The present invention relates to a communicating device capable of receiving packets of audio samples, and more specifically to a method and an arrangement in a receiving communicating device of compensating for a difference in the clock frequency between said receiving communicating device and a sending communicating device, the clock frequency controlling the audio sample rate.

BACKGROUND

In a conventional circuit switched telephony network, each telephone exchange receives a synchronization clock signal that is distributed hierarchically to every node in the network, thereby achieving a synchronized communication. However, such a hierarchical synchronization is not always possible in a packet switched network, e.g. when personal computers communicate over the Internet.

In e.g. IP (Internet Protocol)-telephony, voice samples are forwarded from a sending communicating device to a receiving communicating device, and the latency, or delay, of the connection defines the time it takes for a data packet to be transported between the sending communicating device and the receiving communicating device. The packets are stored temporarily in buffers in the nodes of the packet switched network, and the varying storage time in the buffers leads to variations in the delay, which is referred to as a delay jitter. While a circuit switched network normally is designed to minimize the jitter, a packet switched network is designed to maximize the link utilization by queuing the packets in the buffers for subsequent transmission, which will add to the delay jitter.

Protocols used to carry voice signals over the IP network are commonly referred to as VoIP (Voice over Internet Protocols), allowing a unified network to be used for multiple services. An incoming IP-phone call may be automatically routed to an IP-phone located anywhere, and thereby a user is allowed to make and receive phone calls using the same phone number during travelling, regardless of location. However, VoIP involves drawbacks, such as delay, packet loss and the above-described delay jitter. The delay jitter may lead to buffer underrun, when a play-out buffer runs out of voice data to play because the next voice packet has not arrived, but the consequences of the jitter are normally reduced by a de-jittering buffer located in the receiving communicating device. The de-jittering buffer adds a variable extra delay before the audio samples of the packet are played out, to keep the overall delay time constant, or slowly varying, in order to minimize the overall delay at some given packet loss rate depending on the current network conditions. Thereby, the occurrence of buffer underrun due to delay jitter may be avoided, but the overall delay is increased.

Additionally, the clock frequency controlling the sample reception in a receiving communicating device is not exactly the same as the clock frequency of the sending communicating device, due to differencies in e.g. the quartz crystal oscillators of the clocks. The difference between the transmitting clock frequency, $f_{Tx}$, and the receiving clock frequency, $f_{Rx}$, of the samples is commonly referred to as clock skew. The accuracy A of a clock is often expressed in ppm (part per million), and in existing IP-telephony connections, the clock skew is normally less than 60 ppm (parts per million), but may in some cases reach 300 ppm. In a data packet containing M samples, the time period of the packet is M/f, and the actual difference between the packet time period in the transmitter and in the receiver can be expressed as $\tau=(M/f_{Tx})-(M/f_{Rx})$, which is sometimes called clock skew parameter, but is hereinafter referred to as the clock skew, $\tau$, which may have a positive or a negative value.

The difference between the point of time indicated by the clock in the receiver and the clock in the transmitter will accumulate over time, and cause problems. If the clock frequency of the transmitter is higher than that of the receiver, the clock skew, $\tau$, is negative and the receiver will continuously receive more samples than it is able to play out following its own clock frequency, which will lead to an overrun of the play-out buffer in the receiver. If, however, the clock frequency in the transmitter is lower than in the receiver, the clock skew is positive and the play-out buffer in the receiver will at certain interval run out of audio samples to play out, i.e. an underrun.

A receiver may have a play-out buffer accommodating only the samples of one packet, and those samples are read from the buffer at play-out. If a new packet arrives before the previous packet has been played-out from the buffer, the packet will be written over before play-out, resulting in a packet slip. Similarly, if the data of the buffer is played-out before arrival of a packet, there is no data to read, which also will result in a packet slip.

Thus, both overrun and underrun of the play-out buffer will cause a packet slip to occur at regular time intervals, when the accumulated error in the expected packet arrival time reaches the packet time period $M/f_{Rx}$ of the receiving communicating device, of which M is the number of audio samples in the packet. The time period between the packet slips is inversely dependent on the size of the clock skew, since a large clock skew will lead to more frequent packet slips. Following from the above-described relationships, the mean value $T_{PER}$ of the time period between the packet slips may be calculated as the absolute value of $1/(1-f_{Tx}/f_{Rx})$. The influence of the jitter results in an actual time period between the packet slips that varies around this mean value. Thus, the delay jitter and the clock skew will both contribute to a synchronization error. However, the effects of the delay jitter may be avoided by a de-jittering buffer, as described above, but the clock skew will still result in overrun or underrun of the play-out buffer.

The effects of the clock skew can be reduced by a continuous adjustment of the clock frequencies, e.g. by the use of GPS (Global Positioning System). However, this is not always possible, e.g. when the audio sample rate is controlled by an independent hardware clock in the audio card of a standard personal computer, or when an IP network and a PSTN (Public Switched Telephone Network) are interconnected by a Media Gateway, in which case the play-out rate of the audio samples is always synchronized with the PSTN clock. A so-called Media Gateway is commonly used to connect different types of communication networks, and is able to convert data from the format required for one type of network to the format required for another.

Another method of compensating for the clock skew is by signal processing, e.g. by duplicating a sample value in the play-out buffer each time the receiver clock has gained one sample time relative the transmitter clock, and to correspondingly delete one sample each time the receiver clock has lost one sample time. However, this leads to a degradation in the quality of the play-out. A higher quality is achieved if the addition/deletion of a sample is performed during silence periods, but this is only satisfactory when the background is relatively silent.

In Tõnu Trump: "Maximum Likelihood Trend Estimation in Exponential Noise", IEEE Transactions on Signal Processing, Vol. 49, No. 9, September 2001, pages 2087-2095, is addressed how to estimate a linear trend in noise, and in particular how to derive a recursive algorithm for estimating said clock skew, which may be used in real-time applications. Further, Tõnu Trump describes in "Compensation for clock skew in voice over packet networks by speech interpolation", Proc. IEEE International Symposium on Circuits and Systems, Vol. 5, pp. V-608-V-611, May 2004, an algorithm for compensating for the clock skew by performing a more complex signal processing of the received audio samples in a receiving communicating device. The algorithm performs resampling of the number of samples in the play-out buffer in the receiver depending on an estimation of the clock skew, and the resampling involves interpolation of samples, preferably using spline interpolation. Resampling is a process of changing the sampling rate of a signal, either downsampling or upsampling, by dividing/multiplying the sampling rate with an appropriate resampling factor, and interpolation involves construction of additional samples from known samples. While linear interpolation performed on known samples interpolates a linear function between the samples, spline interpolation uses low degree polynomials in each of the intervals between the known samples. However, the above-described theories are difficult to implement in practical communication systems, since they are adapted for complete test vectors, and can not be applied continuously on every received packet.

Thus, the clock skew still presents a problem in applications when the clocks cannot be synchronized, leading to packet losses and disturbances in the audio content.

SUMMARY

The object of the present invention is to address the problems outlined above, and to provide efficient compensation for the clock skew. This object and others are achieved by a method and an arrangement, according to the appended independent claims.

According to one aspect, a method is provided in a receiving communicating device of compensating for the difference between the clock-frequency controlled sample rate of the receiving communicating device and of a sending communicating device. The sending communicating device transmits packets comprising M audio samples to the receiving communicating device, and 0, 1 or 2 packets are received and stored in a buffer in the receiving communicating device, the buffer accommodating at least 2·M audio samples. Further an estimation of the clock skew, $\tau$, is continuously updated from a calculated accumulated difference between expected and actual point of time of reception of said audio samples. Before play-out, an adjusted number N of audio samples to be read from said buffer is calculated using said estimation of the clock skew, and the adjusted number N audio samples are read from the buffer. Thereafter, the N audio samples are resampled to M samples to play-out by interpolation.

Said receiving communicating device may be an end-user terminal, a Media Gateway, or any other communicating device acting as a network node.

The method may comprise an additional step of controlling the number b of samples stored in the buffer, comprising a calculation of an adjusted value $N_{lim}$ of samples to be read out from said buffer. Thereby, packet slips caused by e.g. estimation errors are further reduced.

$N_{lim}$ may correspond to the number b of samples stored in the buffer when N is larger than b to prevent underflow of the buffer, and b−M when b is larger than 2·M, to prevent overflow.

Alternatively, in order to avoid the need of a separate de-jittering buffer, $N_{lim}$ may correspond to the number b of samples stored in the buffer minus $B_0$ when N is larger than $b-B_0$, and to $b-(B_0+M)$ when b is larger than $B_0+2·M$, of which the value of $B_0$ depends on $T_{jitter}$ and of the clock frequency of the receiving communicating device. The value of $T_{jitter}$ is the selected time interval by which a packet is delayed before play-out to compensate for delay jittering, and it may be fixed or adaptive.

The interpolation method may comprise spline interpolation, such as cubic spline interpolation, and said packets may be IP-packets, i.e. packets encapsulated and transmitted according to the Internet Protocol.

According to another aspect, an arrangement is provided in a receiving communicating device of compensating for the difference between the clock-frequency controlled sample rate of the receiving communicating device and of a sending communicating device. The sending communicating device transmits packets comprising M audio samples to the receiving communicating device, and the compensation is performed before play-out of each packet. The arrangement comprises a buffer accommodating at least 2·M samples for storing 0, 1 or 2 received packets, a clock skew estimating unit for continuously updating an estimation of the clock skew from a calculated accumulated time difference between expected and actual point of time of reception of the M audio samples, a converting unit for calculating an adjusted number of N audio samples before play-out to be read from said buffer from said estimation of the clock skew, and an interpolating unit for resampling by interpolation the N audio samples read from the buffer to M audio samples to be played-out.

Said receiving communicating device may be an end-user terminal, a Media Gateway, or any other communicating device acting as a network node.

The arrangement may further comprise a limiting unit for controlling the number b of samples stored in the buffer by calculating of an adjusted value $N_{lim}$ of samples to be read out from said buffer. $N_{lim}$ may correspond to the number b of samples stored in the buffer when N is larger than b to prevent underflow of the buffer, and to b−M when b is larger than 2·M. Thereby, packet slips caused by e.g. estimation errors are further reduced.

Alternatively, in order to avoid the need of a separate de-jittering buffer, $N_{lim}$ may correspond to the number b of samples stored in the buffer minus $B_0$ when N is larger than $b-B_0$, and to $b-(B_0+M)$ when b is larger than $B_0+2·M$, of which the value of $B_0$ depends on $T_{jitter}$ and of the clock frequency of the receiving communicating device.

The interpolation unit may be spline interpolation unit, and more specifically a cubic spline interpolation unity, and said packets may be IP-packets, i.e. packets encapsulated and transmitted according to the Internet Protocol.

BRIEF DESCRIPTION OF THE DRAWINGS

The present invention will now be described in more detail and with reference to the accompanying drawings, in which.

DETAILED DESCRIPTION

Thus, this invention compensates for the clock skew caused by different, non-synchronized clock frequencies in a sending communicating device and a receiving communicating device, which may be an end user communicating device or a so-called telecommunication network node, such as e.g. a Media Gateway. This is accomplished by compensating for the overrun and underrun occurring in the play-out buffer in a receiving communicating device by a compensation procedure, which is performed on each received packet containing M audio samples, on packet-by-packet basis.

Initially, the compensation procedure performs a calculation of the accumulated error in the expected arrival time of the M samples of 0, 1 or 2 packets, and a continuous updating of an estimation of the clock skew. Thereafter, at the delivery of a packet, it performs a clock skew compensating calculation of a different number N samples to be read from the play-out buffer from the estimated clock skew, and a resampling of the N read samples by the factor M/N by interpolation, thereby creating M audio samples to be played-out, in which the clock skew is compensated for.

The resampling is a process where the incoming samples are used as a basis for creating a second set of samples played out at a different rate, i.e. number of samples per time frame. This second set of samples is synchronous with the receiving communicating device, meaning that the rate at which the samples are consumed from the sending communication device is controllable by the resampling process. Thereby, a compensation for the difference in the clock frequency between the sending communicating device and the receiving communicating device is achieved, and most of the packet slips caused by the different clock frequencies can be eliminated.

The time delay introduced by the clock skew compensation according to this invention is at least one packet period $M/f_{Rx}$, since otherwise packet slips would occur, e.g. in the case when $f_{Tx}$ is smaller than $f_{Rx}$. Packet slips may still occur due to estimation errors, but the time periods between the packet slips are increased considerably.

However, in order to reduce the packet slips caused by said estimation errors, the actual number of samples, b, in the buffer may be monitored and limited to be between 0 and 2·M. If more samples, N, are requested to be read out from the buffer than the actual number of samples, b, in the buffer, then only all the remaining samples will be read to avoid underflow, and if the actual number of samples, b, in the buffer is larger than 2·M, then all remaining samples above M will be read to avoid overflow. This is achieved according to a second embodiment of the invention by a limiting procedure involving a comparison between the actual number of samples b in the buffer and the calculated value of N samples to read from the buffer, and with the number 2·M, and by an adjustment of the number N of samples to be read out from the buffer accordingly. If the value N is larger than the number b, then N is adjusted to correspond to b, and if b is larger than 2·M, then N is adjusted to correspond to b−M. Thereby, most of the remaining packet slips are eliminated, and the mean time delay is limited to $M/f_{Rx}$.

According to a third embodiment of this invention, the clock skew compensating procedure compensates for the delay jitter, as well, and thereby no additional conventional de-jittering buffer will be needed. This is accomplished by introducing an additional number of $B_0$ samples in the buffer to compensate for the delay jitter, $B_0 \approx f_{Rx} \cdot T_{jitter}$, and limiting the number, b, of samples in the play-out buffer to be between $B_0$ and $B_0 + 2 \cdot M$, by an appropriate adjustment of the number of samples N to be read out. If N is larger than the actual number b minus $B_0$ samples in the buffer, then N is adjusted to $b - B_0$ to avoid underflow and to always keep $B_0$ samples in the buffer. Correspondingly, if b is larger than $B_0 + 2 \cdot M$, than N is adjusted to correspond to $b - (B_0 + M)$. The compensation procedure may be configured for any value of $T_{jitter}$, causing no distortions as long as the packets come in order. Thereby, the configuration of the receiving communicating device is simplified, since no separate de-jittering buffer is required.

Figure 1:
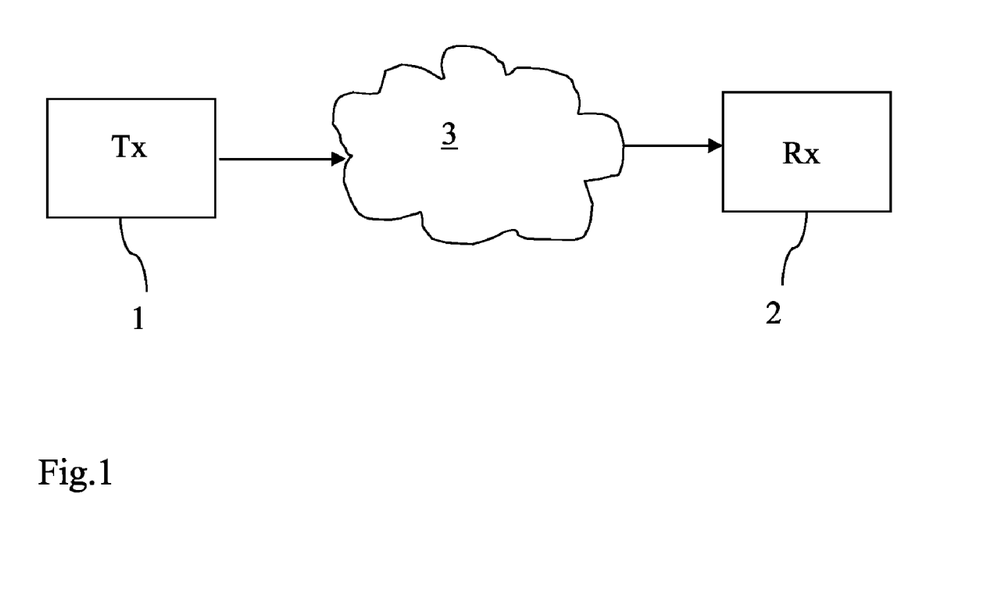
FIG. 1 schematically illustrates two communicating devices communicating over a packet switched network.

FIG. 1 shows two communicating devices communicating over a packet switched network 3, both communicating devices normally capable of functioning both as a transmitting communicating device and a receiving communicating device, by means of suitable hardware and software, according to the common general knowledge of the skilled person within the technical field. However, in this figure, one of the communicating devices 1 is denoted the transmitting communicating device, Tx, and the other communicating device, 2, is denoted the receiving communicating device, Rx. The clocks of the transmitting communicating device and the receiving communicating device are not synchronized, and an audio signal that is sampled with the sampling frequency $f_{Tx}$ in the transmitting communicating device 1 will be played-out with a slightly different sampling frequency $f_{Rx}$ in the receiving communicating device 2. The transmitting communicating device 1 sends packets to the receiving communicating device 2, each packet containing M audio samples, M typically being a multiple of 40, such as e.g. 40, 80 and 160, and each of the audio samples of a packet is transmitted at the time instances $t_{Tx}$ controlled by the clock frequency $f_{Tx}$ of the transmitting communicating device 1. The packets are expected by the receiving communicating device at the expected time instances $t_{Rx}$ controlled by the clock frequency $f_{Rx}$ of the receiving communicating device, to which an expected transmission delay time, $d_{Rx}$ has been added. However, the actual arrival time $t_R$ of each packet will normally not correspond exactly to this expected arrival time, due to the delay jitter and the clock skew.

Figure 2:
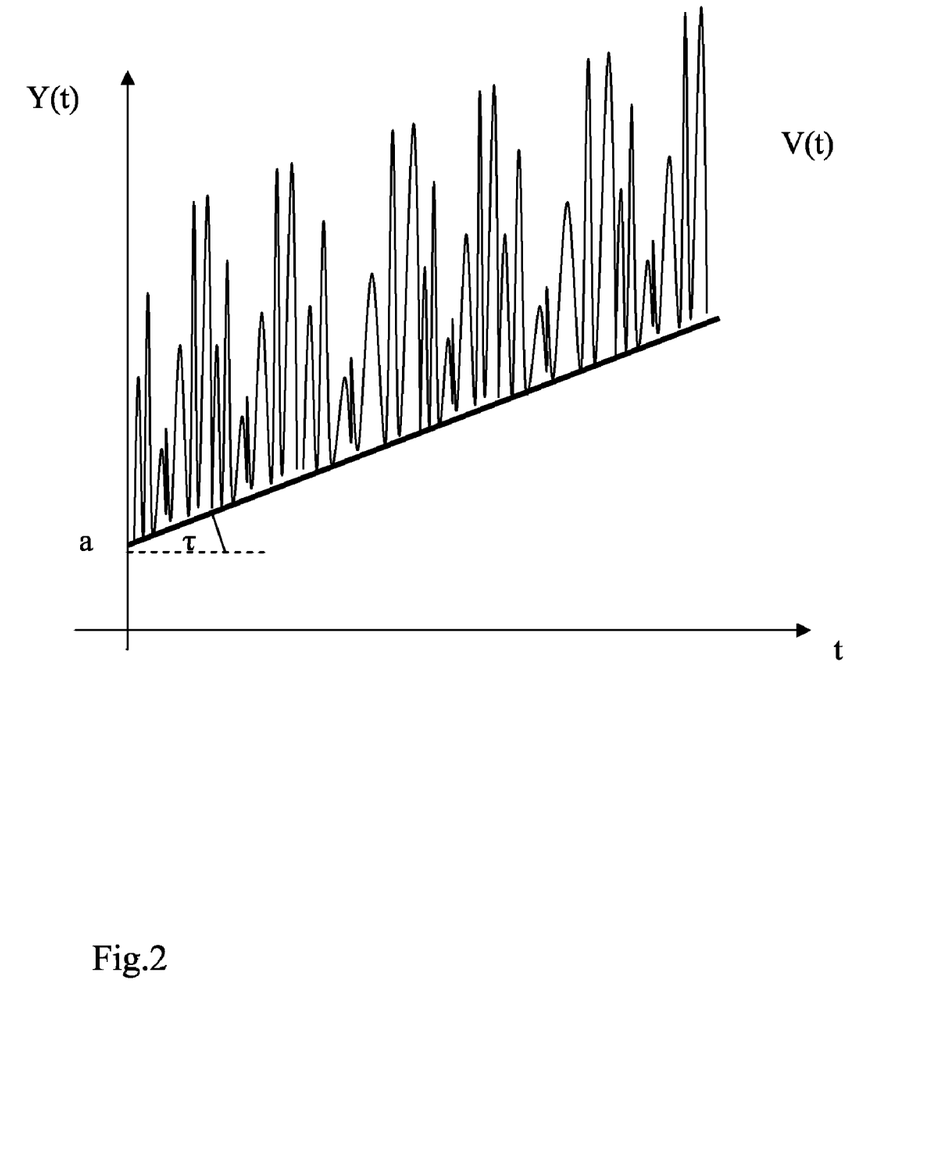
FIG. 2 is a graph illustrating the accumulation of the error in the expected arrival time of a packet, FIG. 3 schematically illustrates a receiver comprising a de-jittering buffer.

The difference between the actual and the expected arrival time of the packets will also accumulate over time and can be defined as $y(t) = t_R - t_{Rx}$. The contribution of the clock skew to y(t) is a linear function with the slope τ, and the contribution of the jitter v(t) adds a random contribution to y(t), as illustrated in FIG. 2. This graph shows $y(t) = a + \tau t + v(t)$, of which $y(t) = t_R - t_{Rx}$, i.e. said difference between the actual and the expected arrival time of the packets, the parameter a can be interpreted as a correction of the expected transmission delay, and the clock skew, τ, controls the slope.

Figure 3:
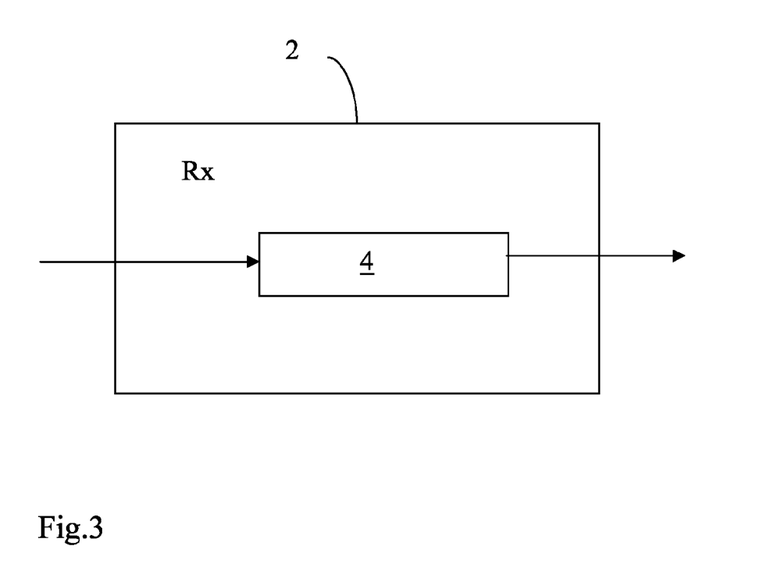

FIG. 3 schematically illustrates a receiving communicating device 2 comprising a de-jittering buffer 4 according to prior art, which is commonly used to solve the problem caused by the delay jitter. Packets containing M audio samples are input in the receiving communicating device at an actual arrival time $t_R$, and stored in the de-jittering buffer 4, which suitably comprises a FIFO (First-In First-Out)-buffer having the size M. The samples are read from the de-jittering buffer at the scheduled play-out time, which is calculated by an addition of a time interval $T_{jitter}$ to compensate for the jitter v(t). A larger added $T_{jitter}$ reduces the risk that a delayed packet will not be played-out, i.e. it reduces the risk for a packet slip, but it will also increase the overall delay. Therefore, $T_{jitter}$ is preferably estimated such that ideally no sample will be read from the de-jittering buffer until after the actual arrival time, thereby compensating for the jitter, while at the same time introducing the smallest possible delay. However, since the difference between the expected and the actual arrival time y(t) caused by the contribution from the clock skew will accumulate linearly in time when $\tau \neq 0$, this can not be compensated for by the de-jittering buffer, regardless of the size of $T_{jitter}$, thereby resulting in packet slips due to overrun/underrun.

In order to solve the problem with the clock skew, this invention involves a compensation for the overruns and underruns in the play-out buffer caused by the clock skew.

Figure 4:
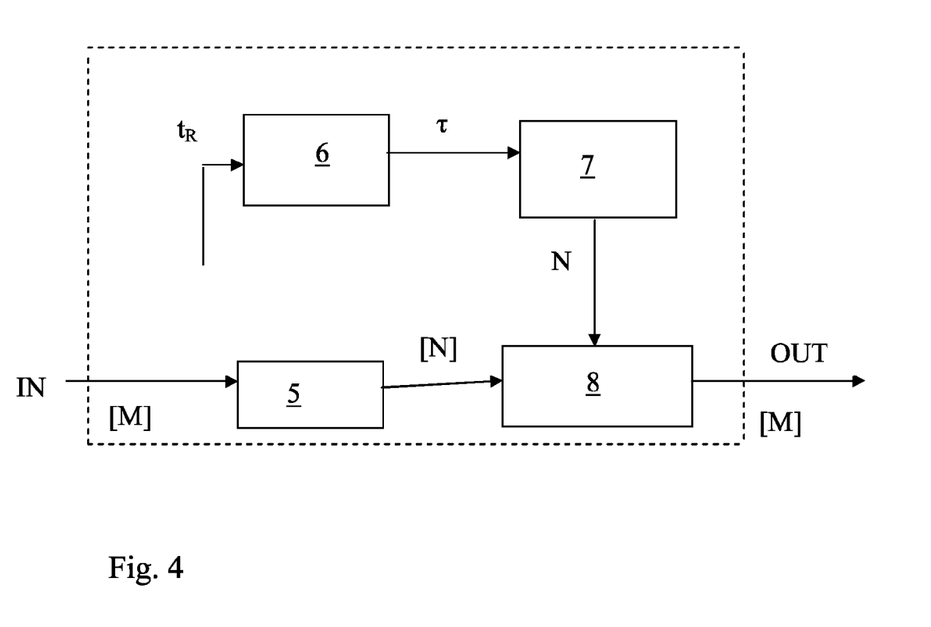
FIG. 4 is a block diagram illustrating the logical function of a clock skew compensating arrangement.

FIG. 4 is a block diagram illustrating an arrangement in a receiving communicating device of performing clock skew compensation, according to a first embodiment of the invention. The packets containing M audio samples are input in the receiver at the actual time instances $t_R$ and stored in a play-out buffer 5, e.g. a FIFO-buffer, having a buffer size of at least 2·M, since 0, 1 or 2 packets may arrive in one packet period. Those time instances $t_R$ are stored in a memory (not shown) until the packets are played out from the buffer. A clock skew estimation unit 6 calculates the accumulated difference y(t) between the actual arrival time $t_R$ and the expected arrival time $t_{Rx}$ of the M samples using the stored time instances $t_R$. Thereafter, the clock skew estimation unit updates the estimated clock skew, $\tau$, accordingly. The value of the estimated clock skew can be calculated mathematically from $t_R - t_{Rx}$ by any suitable clock skew estimating algorithm, preferably a recursive algorithm for implementation in real time systems, e.g. a recursive maximum likelihood algorithm. The purpose of the clock skew estimating algorithm in this invention is to update the value of the estimated clock skew $\tau$ after each received packet of M audio samples, using as input variable the cumulative difference between the actual and the expected arrival time $y = t_R - t_{Rx}$.

Before play-out of the packets, a converting unit 7 receives the estimated clock skew $\tau$ and calculates an adjusted number N of samples to be read from the buffer 5 at the time instant $t_{Rx}$ from said estimated clock skew to compensate for the clock skew in order to avoid underrun or overrun of the buffer. This is achieved by scaling the number M according to the frequency ratio $f_{Tx}/f_{Rx}$, by selecting a value N that is a result of the rounding of $n = M \cdot (f_{Tx}/f_{Rx})$ to the closest integer. However, the input to the converting unit will be an estimation of the clock skew, $\tau = (M/f_{Tx}) - (M/f_{Rx})$, and $f_{Tx}$ is not known by the receiving communicating device. Since n must be obtainable by the receiving communicating device from $\tau$ as an input value, and $f_{Tx}$ is unknown to the receiver, n may e.g. be derived via the accuracy A, which may be expressed as $A_{Tx} = -(f_{Rx} \cdot \tau)/(M + f_{Rx} \cdot \tau)$, from which n may be calculated as $n = M^2/(M + f_{Rx} \cdot \tau)$.

An interpolating unit 8 receives the value N from the converting unit 7, reads N samples from the buffer 5, and resamples the N samples by interpolation to provide a packet containing M samples to be delivered at the output. This resampling is equivalent with a change of the sampling rate by the factor M/N, and can be achieved with any suitable digital signal processing technique. One exemplary method of resampling is performed by first interpolating the signal with M−1 zeros after each sample, thereafter providing low pass filters to avoid aliasing, i.e. that two different continuous signals become indistinguishable when sampled, and finally performing a decimation with the factor N. However, this method is complicated when the ratio M/N is close to 1. A preferred method of resampling by interpolation is to apply spline interpolation, which has a lower complexity when M/N is close to 1. Splines are piecewise polynomials with pieces that smoothly connect together and a zero order B-spline, $\beta^0(t)$, is a rectangular pulse, and an n-th order B-spline is n+1 times a convolution of $\beta^0(t)$ with itself.

Figure 5:
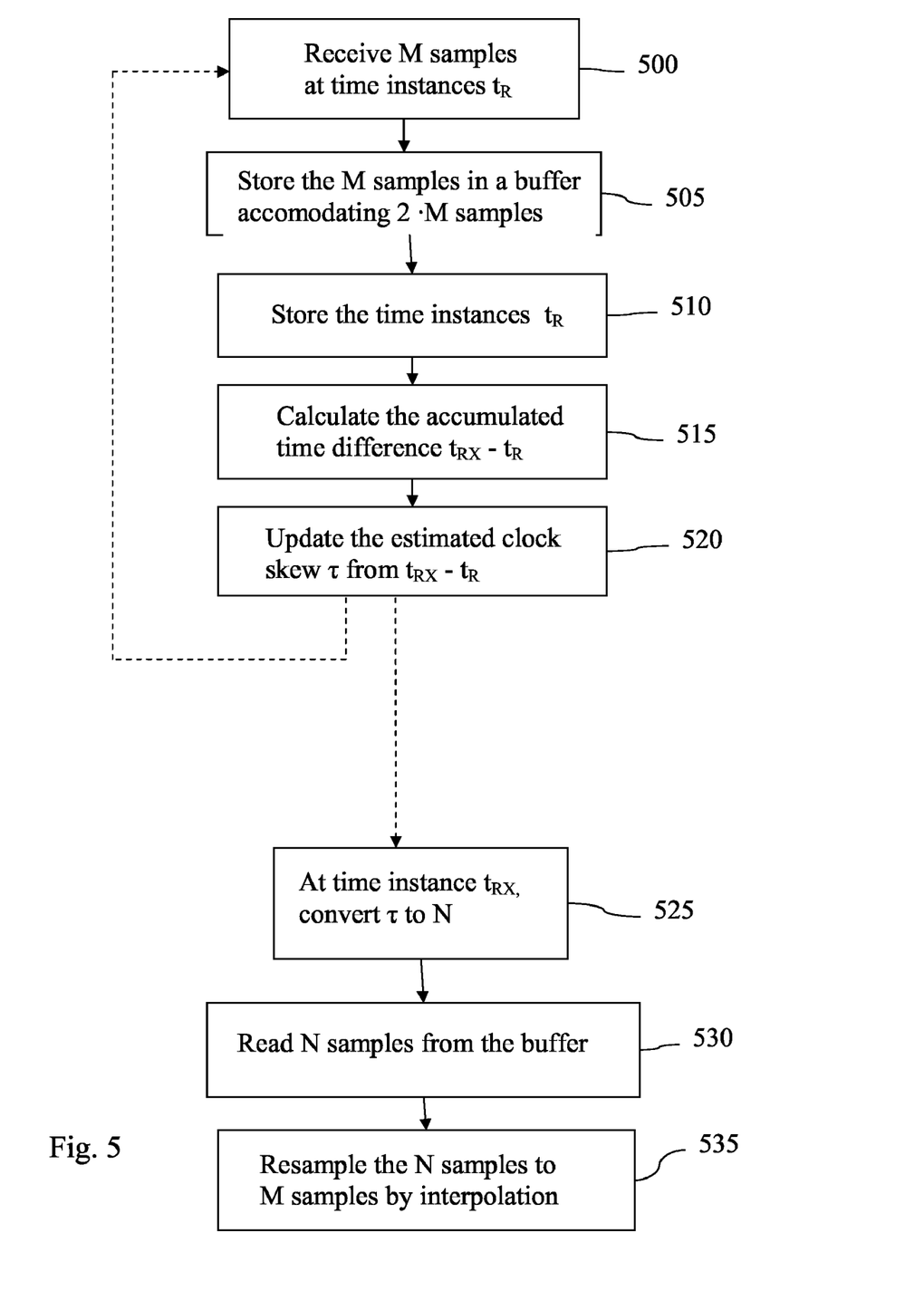
FIG. 5 is a flow chart the clock skew compensation method according to a first embodiment of the invention.

FIG. 5 is a flow chart illustrating the clock skew compensating method according to a first embodiment of the invention, the first part comprising the steps 500-520 of receiving a packet, which may be performed 0, 1 or 2 times, and the second part comprising the steps 525-530, which are performed when the receiving communicating device has to deliver a packet.

In a first step 500, the receiving communicating device 2 receives a packet containing M audio samples at the actual time instances $t_R$. In a next step 505, the receiving communicating device stores the M audio samples in a buffer 5 having a size of at least 2·M in order to accommodate 0, 1 or 2 packets, the actual number of samples stored in the buffer denoted by b, and the actual time instances are stored in a memory in step 510. In the next step 515, the accumulated time difference between the actual time instances $t_R$ and the expected time instances $t_{Rx}$ is calculated, and in step 520 the value of the estimated clock skew $\tau$ is updated from this calculated difference. The estimated clock skew is calculated by a suitable algorithm, e.g. a recursive maximum likelihood algorithm.

When the packets has to be delivered, i.e. played-out, the estimated clock skew is converted, in step 525, to a number N of samples to be read from the buffer 5 at the time instances $t_{Rx}$ in order to compensate for the clock skew. The number N is obtained by a scaling of the number M with the ratio $f_{Tx}/f_{Rx}$, using the relationship $N = M^2/(M + f_{Rx} \cdot \tau)$, which follows from the definition of the clock skew $\tau = (M/f_{Tx}) - (M/f_{Rx})$. In step 530, N number of samples are read from the buffer 5, and in step 535, the N samples are resampled to M samples by interpolation, e.g. by spline interpolation, or by any other suitable digital resampling technique.

Figure 6:
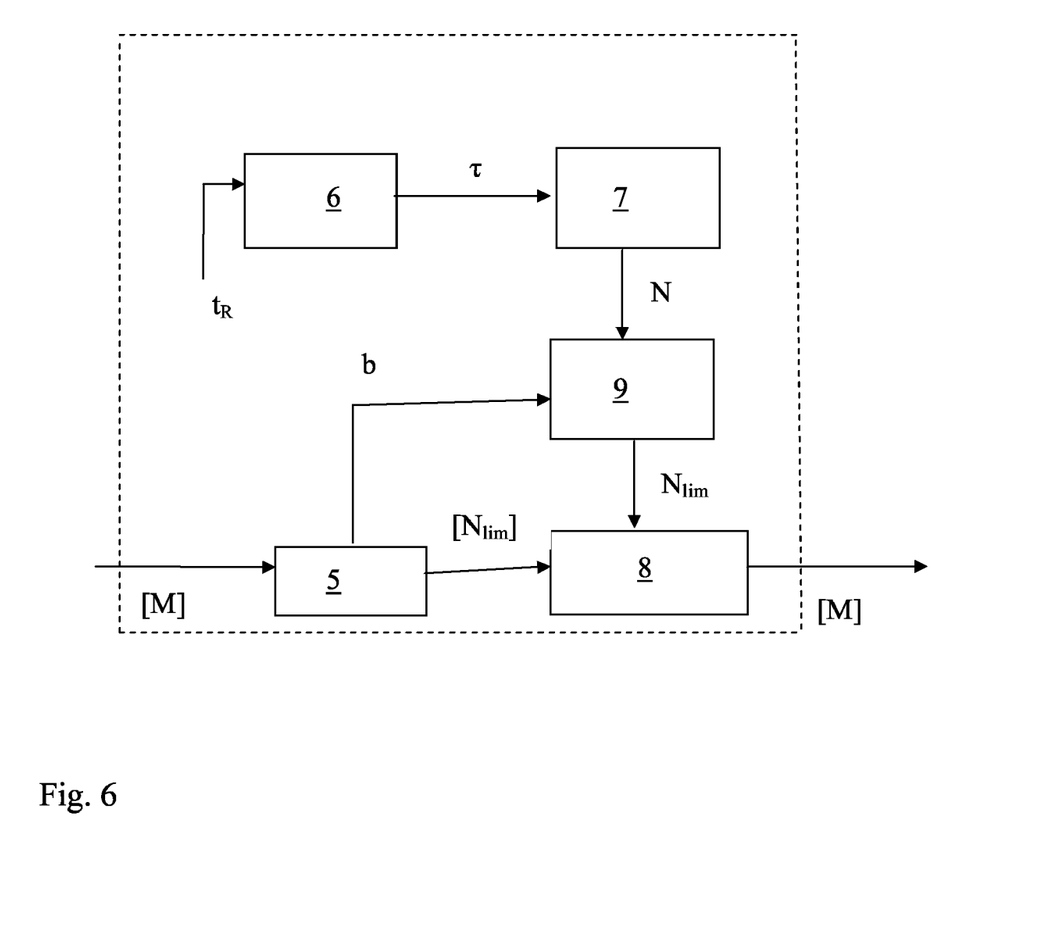
FIG. 6 is a block diagram illustrating the second and third embodiments of the clock skew compensating arrangement, comprising a limiting unit.

FIG. 6 shows an arrangement according to a second embodiment of the invention, in which the clock skew estimating arrangement is provided with a limiting unit 9 for controlling the actual number b of samples stored in the buffer 5, keeping the number b of samples to be between 0 and 2·M. This is implemented by a comparison between the calculated number N to be read from the buffer and the stored number b of samples in the buffer. If the number N is larger than the stored number, b, of samples in the buffer, the number N is adjusted to $N_{lim} = b$, thereby only b number of samples in the buffer will be read and underflow of the buffer is prevented. If the number b of samples in the buffer is larger than 2·M, all the samples above the number of M will be read, i.e. $N_{lim} = b - M$, thereby limiting the stored number of samples in the buffer and preventing overflow.

In prior art, a de-jittering buffer 4 may be used to compensate for delay jittering by delaying each packet by a time period $T_{jitter}$ before play-out. The value of $T_{jitter}$ may be fixed or adaptive, and is selected as a compromise between the probability of packet slips and the overall delay introduced by the de-jittering buffer.

However, according to a third embodiment of the invention, the buffer 5 will be used as a de-jittering buffer, as well, to compensate for the delay jitter. This is accomplished by arranging the limiting unit 9 to control the buffer 5 to always keep at least $B_0$ samples in the buffer, and $B_0$ may be approximately $f_{Rx} \cdot T_{jitter}$, rounded to a higher integer. Thus, the limiting unit 9 will compare the calculated number N of samples to be read from the buffer with the number b of stored samples in the buffer, and monitor the stored number b of samples in order to keep the number of samples b to be not less than $B_0$ and not more than $B_0 + 2 \cdot M$ by adjusting the number N of samples to be read accordingly. If the calculated number N of samples to be read is larger than the actual number b of samples in the buffer minus $B_0$, the number of samples N to be read out is adjusted to $N_{lim}=b-B_0$, in order to prevent underflow and to always keep $B_0$ samples in the buffer. If b is larger than $B_0+2 \cdot M$, than all the samples above the number of $B_0+M$ will be read, i.e. $N_{lim}=b-(B_0+M)$, in order to limit the stored number of samples b in the buffer to prevent overflow.

Thereby, the introduced delay according to the third embodiment of the invention will be $(B_0+M)/f_{Rx}$, instead of $M/f_{Rx}$, as in the first and second embodiments. The sample number 0 to $B_0$ in the buffer are used to compensate for the delay jitter, and the samples $B_0$ to $B_0+2 \cdot M$ are used to compensate for the clock skew, and no separated de-jittering buffer is needed.

At the beginning of an operation, the error in the estimated clock skew τ may be significant due to too little available data. Therefore, according to a further embodiment of the invention, the output from the clock skew estimating unit is not used in the beginning of a transmission, e.g. during the reception of the first 50 frames.

While the invention has been described with reference to specific exemplary embodiments, the description is in general only intended to illustrate the inventive concept and should not be taken as limiting the scope of the invention.

The invention claimed is:

1. A method in a receiving communicating device of compensating for a difference between a clock-frequency controlled sample rate of the receiving communicating device and of a sending communicating device, wherein the sending communicating device transmits packets comprising M audio samples to the receiving communicating device, where M is an integer greater than zero (0), said method comprising the steps of:
   receiving 0, 1, or 2 packets comprising audio samples;
   storing the audio samples in a buffer accommodating at least 2·M audio samples in the receiving communicating device before play-out;
   storing the actual time of reception of each of the received audio samples;
   continuously updating an estimation of a clock skew (τ) from a calculated accumulated difference between an expected time of reception and the stored actual time of reception of the audio samples;
   before play-out, calculating an adjusted number N of audio samples to be read from the buffer using the estimation of the clock skew, where N is an integer greater than zero (0) and less than a number of audio samples (b) stored in the buffer;
   reading N audio samples from the buffer; and
   resampling by interpolation, the N audio samples read from the buffer to M samples to play-out.

2. The method in a receiving communicating device according to claim 1, wherein the method is performed in an end-user terminal.

3. The method in a receiving communicating device according to claim 1, wherein the method is performed in a Media Gateway.

4. The method in a receiving communicating device according to claim 1, further comprising controlling the number b of samples stored in the buffer.

5. The method in a receiving communicating device according to claim 4, wherein said step of controlling the number b of samples stored in the buffer includes calculating an adjusted value $N_{lim}$ of samples to be read out from the buffer.

6. The method in a receiving communicating device according to claim 5, wherein $N_{lim}$ corresponds to the number b of samples stored in the buffer when N is larger than b to prevent underflow of the buffer.

7. The arrangement according to claim 6, wherein the limiting unit includes means for controlling the number b of samples stored in the buffer by calculating an adjusted value $N_{lim}$ of 10 samples to be read out from the buffer.

8. The arrangement according to claim 7, wherein $N_{lim}$ corresponds to the number b of samples stored in the buffer when N is larger than b to prevent underflow of the buffer.

9. The arrangement according to claim 7, wherein $N_{lim}$ corresponds to b−M when b is larger than 2·M.

10. The arrangement according to claim 7, wherein $N_{lim}$ corresponds to the number b of samples stored in the buffer minus the number of samples $B_0$, when N is larger than b−$B_0$, in order to compensate for delay jitter, the value of $B_0$ depending on $T_{jitter}$ and on the clock frequency of the receiving communicating device.

11. The arrangement according to claim 10, wherein $N_{lim}$ corresponds to b−($B_0$+M) when b is larger than $B_0$+2·M.

12. The method in a receiving communicating device according to claim 5, wherein $N_{lim}$ corresponds to b minus M when b is larger than 2·M.

13. The method in a receiving communicating device according to claim 5, wherein $N_{lim}$ corresponds to the number b of samples stored in the buffer minus the number $B_0$, when N is larger than b−$B_0$, in order to compensate for delay jitter, the value of $B_0$ depending on $T_{jitter}$ and on the clock frequency of the receiving communicating device.

14. The method in a receiving communicating device according to claim 13, wherein corresponds to b−($B_0$+M) when b is larger than $B_0$+2·M.

15. The method in a receiving communicating device according to claim 1, wherein the step of resampling by interpolation includes spline interpolating the N audio samples.

16. The method in a receiving communicating device according to claim 15, wherein the step of spline interpolating comprises cubic spline interpolation.

17. The method in a receiving communicating device according to claim 1, wherein the transmitted packets are IP-packets.

18. An arrangement in a receiving communicating device for compensating for the difference between the clock-frequency controlled sample rate of the receiving communicating device and of a sending communicating device, wherein the sending communicating device transmits packets comprising M audio samples to the receiving communicating device, where M is an integer greater than zero (0), said arrangement comprising:
   a buffer accommodating at least 2·M samples for storing 0, 1, or 2 received packets comprising audio samples;
   a memory for storing an actual time of the reception of each of the M audio samples;
   a clock skew estimating unit for continuously updating an estimation of the clock skew from a calculated accumulated time difference between an expected time of reception and the stored actual time of reception of the M audio samples;
   a converting unit for using the estimation of the clock skew to calculate before play-out, an adjusted number of N audio samples to be read from the buffer, where N is an integer greater than zero (0) and less than a number of audio samples (b) stored in the buffer; and
   an interpolating unit for resampling by interpolation, the N audio samples read from the buffer to M audio samples to be played-out;

wherein the arrangement performs the compensation before play-out of each packet.

19. The arrangement according to claim 18, wherein the receiving communicating device is an end-user terminal.

20. Then arrangement according to claim 18, wherein the receiving communicating device is a Media Gateway.

21. The arrangement according to claim 18, further comprising a limiting unit for controlling the number b of samples stored in the buffer.

22. The arrangement according to claim 18, wherein the interpolating unit includes means for performing spline interpolation of the N audio samples.

23. The arrangement according to claim 22, wherein the means for performing spline interpolation performs cubic spline interpolation.

24. The arrangement according to claim 18, wherein the transmitted packets are IP-packets.

* * * * *

UNITED STATES PATENT AND TRADEMARK OFFICE
CERTIFICATE OF CORRECTION

| | |
|---|---|
| PATENT NO. | : 7,949,015 B2 |
| APPLICATION NO. | : 12/439024 |
| DATED | : May 24, 2011 |
| INVENTOR(S) | : Miljkovic et al. |

Page 1 of 1

It is certified that error appears in the above-identified patent and that said Letters Patent is hereby corrected as shown below:

In Column 1, Line 59, delete "differencies" and insert -- differences --, therefor.

In Column 4, Line 65, after "arrangement," delete "and".

In Column 10, Line 6, in Claim 7, delete "$N_{1im}$" and insert -- $N_{lim}$ --, therefor.

In Column 10, Line 7, in Claim 8, delete "$N_{1im}$" and insert -- $N_{lim}$ --, therefor.

In Column 10, Line 10, in Claim 9, delete "$N_{1im}$" and insert -- $N_{lim}$ --, therefor.

In Column 10, Line 12, in Claim 10, delete "$N_{1im}$" and insert -- $N_{lim}$ --, therefor.

In Column 10, Line 19, in Claim 11, delete "$N_{1im}$" and insert -- $N_{lim}$ --, therefor.

In Column 11, Line 6, in Claim 20, delete "Then" and insert -- The --, therefor.

Signed and Sealed this
Fourteenth Day of February, 2012

David J. Kappos
*Director of the United States Patent and Trademark Office*